(12) United States Patent
Servantie et al.

(10) Patent No.: US 9,719,793 B2
(45) Date of Patent: Aug. 1, 2017

(54) SYNTHETIC VISION SYSTEM INCLUDING MEANS FOR MODIFYING THE DISPLAYED VIEW

(71) Applicant: THALES, Courbevoie (FR)

(72) Inventors: Xavier Servantie, Pessac (FR); Didier Poisson, Toulouse (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/958,812

(22) Filed: Dec. 3, 2015

(65) Prior Publication Data
US 2016/0161278 A1    Jun. 9, 2016

(30) Foreign Application Priority Data
Dec. 5, 2014    (FR) .................................... 14 02781

(51) Int. Cl.
*G01C 21/36*    (2006.01)
*G01C 21/00*    (2006.01)
(Continued)

(52) U.S. Cl.
CPC ......... *G01C 21/3635* (2013.01); *G01C 21/00* (2013.01); *G01C 23/00* (2013.01);
(Continued)

(58) Field of Classification Search
CPC .... G01C 21/3635; G01C 21/00; G01C 23/00; G02B 27/01; G06F 3/012; G08G 5/0021;
(Continued)

(56) References Cited

U.S. PATENT DOCUMENTS

| | | |
|---|---|---|
| 7,218,245 B2 | 5/2007 | Wyatt et al. |
| 8,159,416 B1 | 4/2012 | Yum et al. |

(Continued)

FOREIGN PATENT DOCUMENTS

EP    2 541 210 A1    1/2013

OTHER PUBLICATIONS

French Search Report for corresponding French Patent Application No. 1402781, 8 pp., (Sep. 29, 2015).
(Continued)

*Primary Examiner* — Michael D Lang
(74) *Attorney, Agent, or Firm* — Blakely, Sokoloff, Taylor & Zafman LLP

(57) ABSTRACT

The general field of the invention is that of synthetic vision systems for a vehicle, said vehicle having a particular navigation direction. The system in accordance with the invention includes at least:
- a cartographic database representative of the terrain travelled over by the vehicle,
- means for geolocation of said vehicle,
- electronic means for computing a representation of the principal parameters of said vehicle;
- graphic generator means for generating a three-dimensional synthetic representation of said terrain; and
- a display device displaying said three-dimensional synthetic representation in a particular field of view (FOV) and in a particular display direction,
- means for modifying the display direction to a direction different from the particular navigation direction of the vehicle, said modification means being manual or automatic, the display direction then being a function of a piloting or navigation parameter.

4 Claims, 2 Drawing Sheets

(51) Int. Cl.
*G01C 23/00* (2006.01)
*G06F 3/01* (2006.01)
*G08G 5/00* (2006.01)
*G02B 27/01* (2006.01)
*G09B 29/00* (2006.01)

(52) U.S. Cl.
CPC ............ *G02B 27/01* (2013.01); *G06F 3/012* (2013.01); *G08G 5/0021* (2013.01); *G08G 5/0052* (2013.01); *G08G 5/0086* (2013.01); *G09B 29/007* (2013.01); *G02B 2027/014* (2013.01)

(58) Field of Classification Search
CPC ... G08G 5/0052; G08G 5/0086; G09B 29/007
See application file for complete search history.

(56) References Cited

U.S. PATENT DOCUMENTS

2008/0158256 A1* 7/2008 Russell ................ G06T 7/0026
345/629
2014/0267723 A1 9/2014 Davidson, Jr. et al.

OTHER PUBLICATIONS

J.J. (Trey) Arthur III, et al., "Design and Testing of an Unlimited Field-of-Regard Synthetic Vision Head-Worn Display for Commercial Aircraft Surface Operations", retrieved from the Internet: http://ntrs.nasa.gov/archive/nasa/casi.ntrs.nasa.gov/20070018771.pdf, 19 pp., (Jan. 1, 2007).

* cited by examiner

SYNTHETIC VISION SYSTEM INCLUDING MEANS FOR MODIFYING THE DISPLAYED VIEW

FIELD

The field of the invention is that of display systems including means for displaying a synthetic image of the outside view. The invention applies very particularly to the aeronautical field but may be applied to any vehicle including means for displaying such a synthetic image.

BACKGROUND

Modern aircraft generally have a synthetic vision system "SVS". This system enables presentation to the crew of a synthetic image of the outside view generally including piloting or navigation information. An SVS system includes a cartographic database representative of the overflown terrain, a geolocation system, electronic computation means, and one or more display devices installed in the cockpit of the aircraft. The geolocation system is of the global positioning system (GPS) type. It may be coupled to the inertial system of the machine. The geolocation system as a whole supplies at least the following parameters: position of the aircraft in terms of latitude, longitude and altitude and orientation of the aircraft in terms of pitch, roll and bearing and finally, accuracy of the location.

The image is generally displayed on the display screens that are located on the front of the instrument panel of the aircraft. It is a three-dimensional view of the outside represented in the most realistic possible manner. The point of view displayed is on the axis of the machine. This image is very attractive for the crew in that it provides them with a view of their environment that is close to reality and in particular a view of certain elements that are fundamental for navigation such as runways.

The representation is necessarily associated with an angle of view, also known as the field of view (FOV). This field of view is centered on the navigation direction of the vehicle. The FOV is not necessarily a simple choice. In effect, if the FOV is very large, distant details are represented with small dimensions, barely visible. If, on the other hand, the FOV is small, the details of interest are of significant size but can rapidly leave the field if they are not situated in the vicinity of the navigation axis of the machine. This problem is shown in FIGS. 1 and 2, which represent a three-dimensional synthetic view of the terrain including symbols that conventionally include an artificial horizon H and vertical bars indicating the altitude A and the speed V of the aircraft. The view includes a runway P that is in bold in the various figures. In FIG. 1, the FOV is large. The runway P appears as a small elongate quadrilateral, not necessarily easy for the user to distinguish. In FIG. 2 the FOV is small. It corresponds to the dashed outline rectangle in FIG. 1. The runway P is larger but is located at the edge of the field and is not necessarily easy for the pilot to identify.

To alleviate these drawbacks, various solutions have been proposed. Thus U.S. Pat. No. 8,159,416 entitled "Synthetic vision dynamic field of view" describes a vision system for aircraft in which the dimensions of the field of view depend automatically on navigation parameters depending, for example, on whether the aircraft is on the ground or in flight, its speed then varying considerably. This solution does not address the problem of objects situated outside the field of view. U.S. Pat. No. 7,218,245 entitled "Head-down aircraft attitude display and method for displaying schematic and terrain data symbology" describes a vision system for aircraft enabling display of simplified symbols representative of the terrain and symbols referenced to the trajectory of the aircraft. Once again, this solution fails to solve the problem of the presentation of three-dimensional objects of small size.

SUMMARY

The synthetic vision system in accordance with the invention for use in vehicles does not have these drawbacks. In this vision system, the field of view of the terrain information is no longer necessarily centered on the navigation direction of the vehicle. An object of interest can therefore be kept in the field of view without drastically reducing its size.

To be more precise, the invention consists in a synthetic vision system for a vehicle, said vehicle having a particular navigation direction, said system including at least:
  a cartographic database representative of the terrain travelled over by the vehicle,
  means for geolocation of said vehicle,
  electronic means for computing a representation of the principal parameters of said vehicle;
  graphic generator means for generating a three-dimensional synthetic representation of said terrain; and
  a display device displaying said three-dimensional synthetic representation in a particular field of view and in a particular display direction,
characterized in that the synthetic vision system includes means for modifying the display direction to a direction different from the particular navigation direction of the vehicle, said modification means being manual.

The invention also concerns a synthetic vision system for a vehicle, said vehicle having a particular navigation direction, said system including at least:
  a cartographic database representative of the terrain travelled over by the vehicle,
  means for geolocation of said vehicle,
  electronic means for computing a representation of the principal parameters of said vehicle;
  graphic generator means for generating a three-dimensional synthetic representation of said terrain; and
  a display device displaying said three-dimensional synthetic representation in a particular field of view and in a particular display direction,
characterized in that the synthetic vision system includes modification means for modifying the display direction to a direction different from the particular navigation direction of the vehicle, said modification means being automatic, the display direction being a function of a piloting or navigation parameter.

The angle between the display direction and the navigation direction is advantageously an increasing function of the rate of turn of the vehicle.

The display direction is advantageously directed toward a particular destination.

The display direction is advantageously directed toward a particular object.

The representation of some or all of the principal parameters of said vehicle is advantageously centered on the navigation direction.

The synthetic vision system advantageously includes a human-machine interface the function of which is instantaneously to recenter the display direction on the navigation direction.

The vehicle is advantageously an aircraft following a flight plan.

BRIEF DESCRIPTION OF THE DRAWINGS

The invention will be better understood and other advantages will become apparent on reading the following description given by way of nonlimiting example and thanks to the appended figures, in which.

DETAILED DESCRIPTION

The geolocated synthetic vision system in accordance with the invention can be applied to all types of vehicle having a geolocation system and a cartographic database. It is however particularly suitable for aircraft in that the recognition of particular positions or objects is fundamental for the navigation of these machines.

The synthetic vision system or SVS in accordance with the invention installed onboard an aircraft includes at least a cartographic database, geolocation means, electronic means for computing a representation of the principal parameters of the aircraft, a graphic computer and at least one display device. The geolocation means are, for example, of the GPS (global positioning system) type optionally coupled to or combined with inertial centers in a hybrid system.

In modern aircraft, the system generally includes a plurality of display devices disposed in the cockpit displaying parameters necessary for piloting and navigation and more generally for accomplishing the mission. These display devices represent in particular a three-dimensional synthetic view of the overflown terrain. This view generally includes symbols for assisting piloting and navigation. It conventionally includes an artificial horizon giving the attitude of the machine and indicators giving the altitude and the speed of the aircraft.

This information is displayed in a particular field of view or FOV. The dimensions of this field can generally be modified to "zoom" into the outside view. This enlargement of the field of view can be done either manually by the pilot or automatically as a function of various parameters such as the flight phase, the speed of the machine or its altitude.

Figure 1:
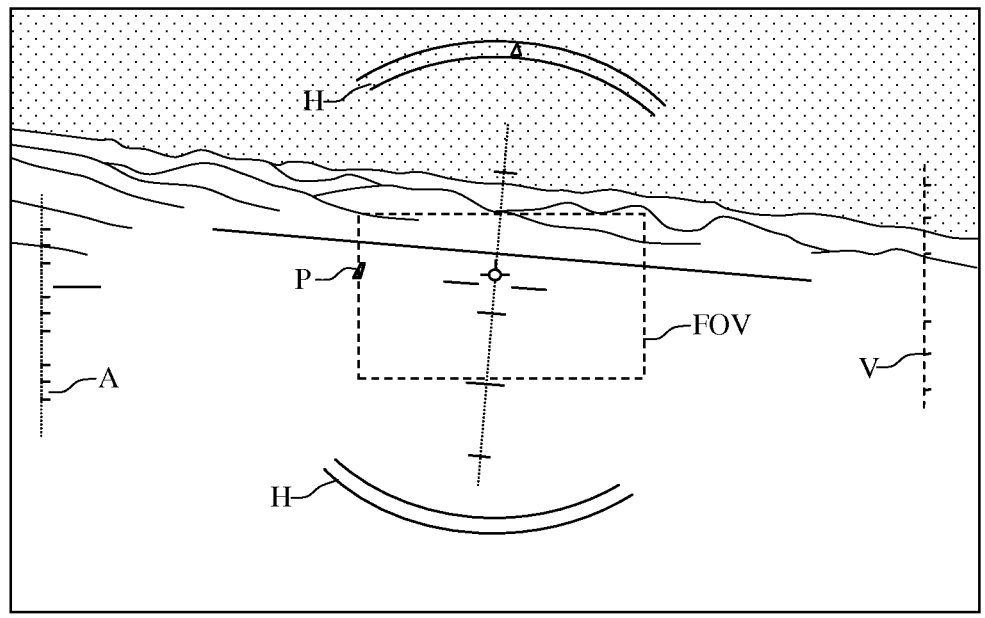
FIG. 1 represents a three-dimensional synthetic view of a terrain including symbols in accordance with a wide first FOV.
Figure 2:
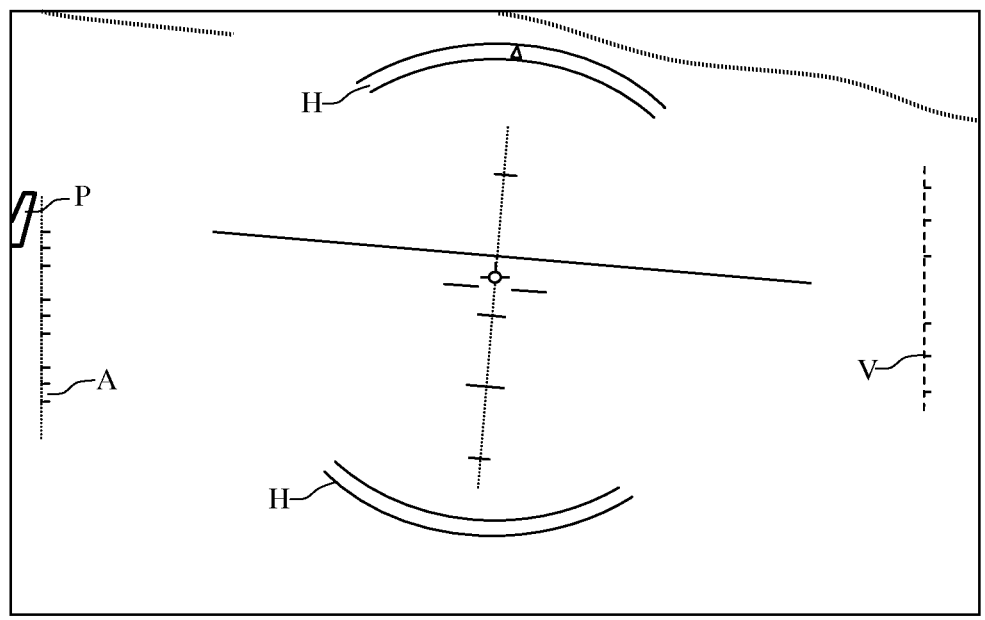
FIG. 2 represents a three-dimensional synthetic view of a terrain including symbols in accordance with a narrow second FOV.
Figure 3:
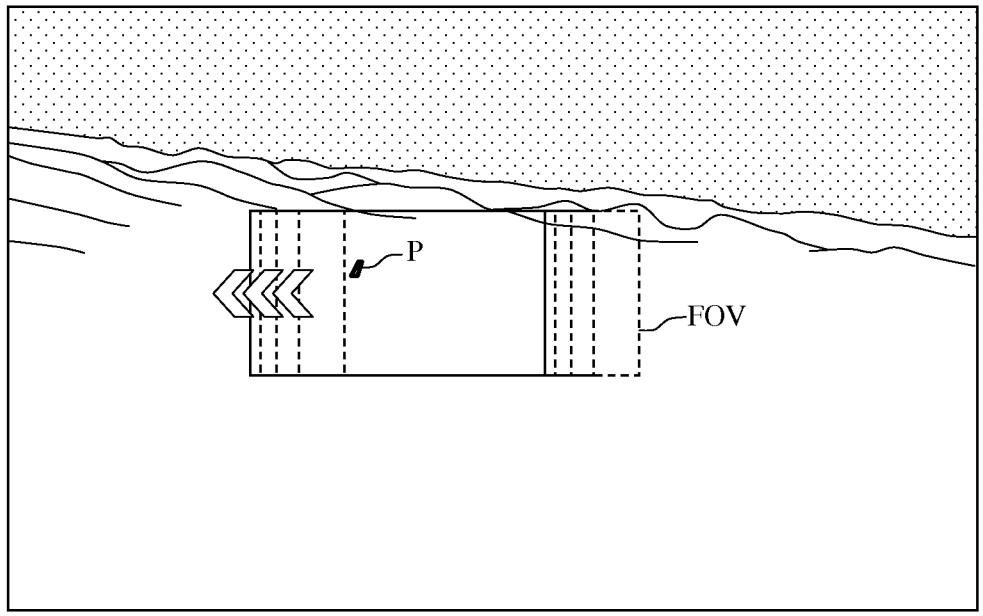
FIG. 3 represents the operating principle of a vision system in accordance with the invention.
Figure 4:
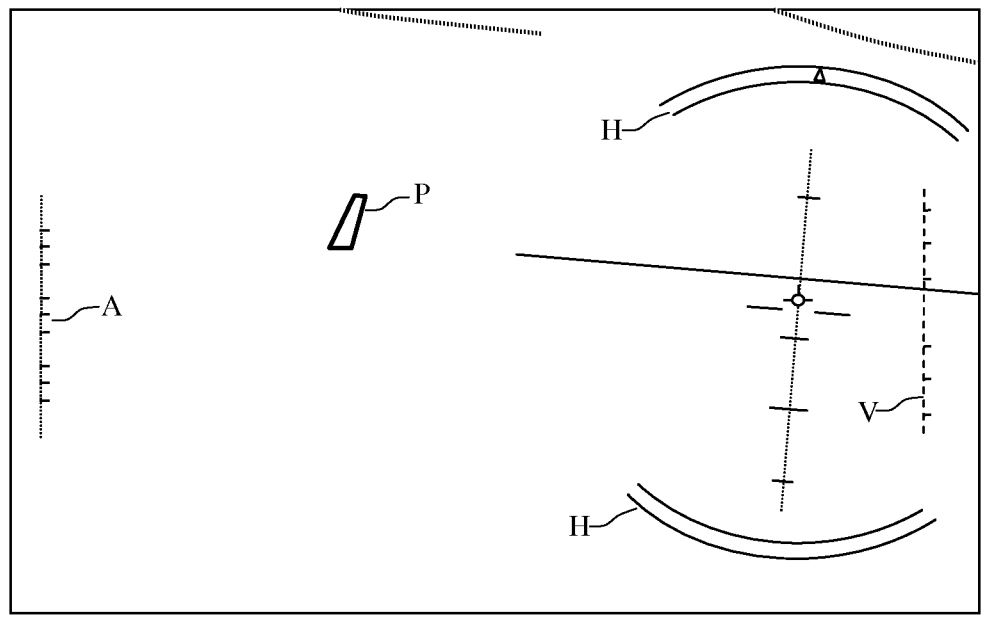
FIG. 4 represents a three-dimensional synthetic view of a terrain including symbols S in accordance with the invention.

This field of view is conventionally centered on the navigation direction of the vehicle. In the system in accordance with the invention, modification means enable modification of the display direction in a direction different from the particular navigation direction of the vehicle, said modification means being manual or automatic. FIGS. 3 and 4 show this modification. FIG. 3 represents a synthetic view of large size. The FOV windows delimited by the various rectangles represent the part of the terrain actually displayed by the display device in a small field of view. The successive dashed outline rectangles represent the variations of the window and the solid outline rectangle represents the FOV window actually selected. The chevrons represent the direction of movement of the window before the selection. Accordingly, by moving this window, it is possible to centre it on the object that is required to have in the field of view. In the present case, this is a runway P. FIG. 4 represents the field of view actually displayed. Note that in this representation the runway P is larger and well centered, thus enabling a better view. Some of the navigation symbols S can remain centered on the navigation direction. This is the case with the artificial horizon H in particular. In the case of FIG. 4, this symbol H attached to the navigation direction is on the right in the figure.

Note that the display direction may be moved in a horizontal plane but equally in a vertical plane or in a combination of the two.

When the modification means are manual, the pilot can use any human-machine interface to modify this navigation direction. These means are, for example, rotary knobs, a touchpad or a transparent touch-sensitive surface placed over the display screen, the FOV being moved by a particular gesture or any other control means.

If the modification means are automatic, the display direction is a function of a piloting or navigation parameter. By way of nonlimiting example, the navigation direction may be an increasing function of the rate of turn of the vehicle or be directed toward a particular destination or a particular object as shown in the various figures. This automatic modification is effected by the onboard computer or computers of the aircraft.

When the navigation direction is different from the display direction, simple and rapid means enable the pilot to recenter the display direction toward the navigation direction. These means may consist in a mechanical or graphic human-machine interface. It must be possible for the user to carry out this recentering as rapidly as possible.

What is claimed is:

1. A synthetic vision system for a vehicle, the vehicle having a particular navigation direction, the synthetic vision system comprising:
   a cartographic database representing a terrain travelled over by the vehicle;
   a geolocation device to determine a geolocation of the vehicle;
   an electronic device to compute a representation of one or more principal parameters of the vehicle;
   a graphic generator device to generate a three-dimensional synthetic representation of the terrain; and
   a display device displaying the three-dimensional synthetic representation in a particular field of view and in a particular display direction,
   wherein the synthetic vision system includes a modification device for modifying the particular display direction to a direction different from the particular navigation direction of the vehicle, the modification device being automatic, and the display direction being a function of a piloting parameter or a navigation parameter.

2. The vehicle synthetic vision system as according to claim 1, wherein the angle between the display direction and the navigation direction is an increasing function of the rate of turn of the vehicle.

3. The vehicle synthetic vision system as according to claim 1, wherein the synthetic vision system includes a human-machine interface the function of which is instantaneously to recenter the display direction on the navigation direction.

4. The vehicle synthetic vision system as according to claim 1, wherein the vehicle is an aircraft following a flight plan.

\* \* \* \* \*